(12) United States Patent
Vuille et al.

(10) Patent No.: US 10,869,527 B2
(45) Date of Patent: Dec. 22, 2020

(54) RIVETED WATCH BAND

(71) Applicant: The Swatch Group Research and Development Ltd, Marin (CH)

(72) Inventors: Pierry Vuille, Les Emibois (CH); Cedric Nicolas, Neuchatel (CH); Yvan Ferri, Lausanne (CH)

(73) Assignee: The Swatch Group Research and Development Ltd., Marin (CH)

( * ) Notice: Subject to any disclaimer, the term of this patent is extended or adjusted under 35 U.S.C. 154(b) by 0 days.

(21) Appl. No.: 16/656,144

(22) Filed: Oct. 17, 2019

(65) Prior Publication Data
US 2020/0046087 A1    Feb. 13, 2020

Related U.S. Application Data

(62) Division of application No. 16/039,834, filed on Jul. 19, 2018, now Pat. No. 10,575,603.

(30) Foreign Application Priority Data

Jul. 24, 2017 (EP) .................................... 17182744

(51) Int. Cl.
*A44C 5/16* (2006.01)
*G04B 37/14* (2006.01)
(Continued)

(52) U.S. Cl.
CPC ............ *A44C 5/16* (2013.01); *G04B 37/1486* (2013.01); *A44C 5/0053* (2013.01);
(Continued)

(58) Field of Classification Search
CPC .. A44C 5/14; A44C 5/16; G04B 37/16; G04B 37/1486; Y10T 24/4782; Y10T 24/4718
See application file for complete search history.

(56) References Cited

U.S. PATENT DOCUMENTS 1,293,944 A    2/1919 Scheinman
1,702,855 A *  2/1929 Swanson .................. A44C 5/16
                                                24/265 WS
(Continued)

FOREIGN PATENT DOCUMENTS

FR    1 528 737        6/1968
FR    2 637 469 A1    4/1990

OTHER PUBLICATIONS

European Search Report dated Jan. 17, 2018 in European Application 17182744.7 filed on Jul. 24, 2017 (with English Translation of Categories of Cited Documents).

*Primary Examiner* — Robert Sandy
*Assistant Examiner* — Michael S Lee
(74) *Attorney, Agent, or Firm* — Oblon, McClelland, Maier & Neustadt, L.L.P.

(57) ABSTRACT

Watch band comprising lower and upper half band portions connected at a fold portion to surround a watch lug at the fold portion, each comprising a drilled hole for the passage of a double rivet comprising lower and upper bodies, either inserted one inside the other or each inserted into a common tube, the band including, at each double rivet, a snap means for ensuring a reversible axial stop for the lower body with respect to the upper body, comprising either a holding plate aligning lower and upper grooves of the lower and upper bodies, or two lower and upper clip lips of the common tube each clip fitted onto a complementary lower or upper lip of the lower or upper body.

7 Claims, 2 Drawing Sheets

(51) Int. Cl.
   *A44C 5/00* (2006.01)
   *F16B 19/10* (2006.01)
(52) U.S. Cl.
   CPC ....... *F16B 19/1072* (2013.01); *Y10T 24/4718* (2015.01); *Y10T 24/4782* (2015.01)

(56) References Cited

U.S. PATENT DOCUMENTS

| | | | | |
|---|---|---|---|---|
| 2,439,274 A * | 4/1948 | Spector | ................... | A44C 5/16 |
| | | | | 224/168 |
| 3,737,082 A * | 6/1973 | Millman | ................ | A44C 5/145 |
| | | | | 224/168 |
| 3,929,265 A * | 12/1975 | Pyne | ........................ | A44C 5/16 |
| | | | | 224/178 |
| 4,670,947 A * | 6/1987 | Lauper | ................... | A44C 5/24 |
| | | | | 24/265 WS |
| 2009/0083949 A1* | 4/2009 | Wolfgang | ................ | A44C 5/16 |
| | | | | 24/265 WS |
| 2013/0052978 A1* | 2/2013 | Sabin | .................. | A01K 27/009 |
| | | | | 455/404.1 |

* cited by examiner

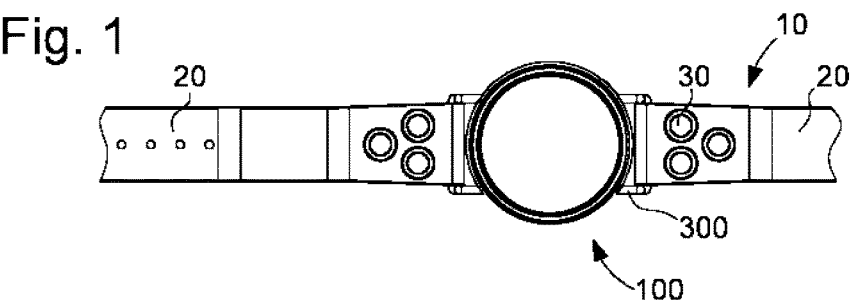
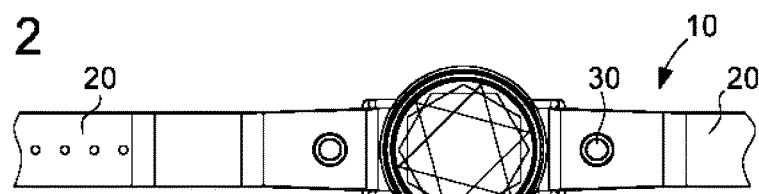
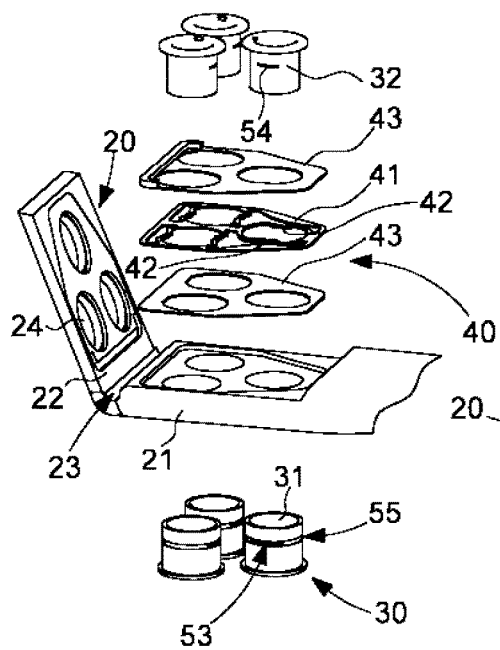
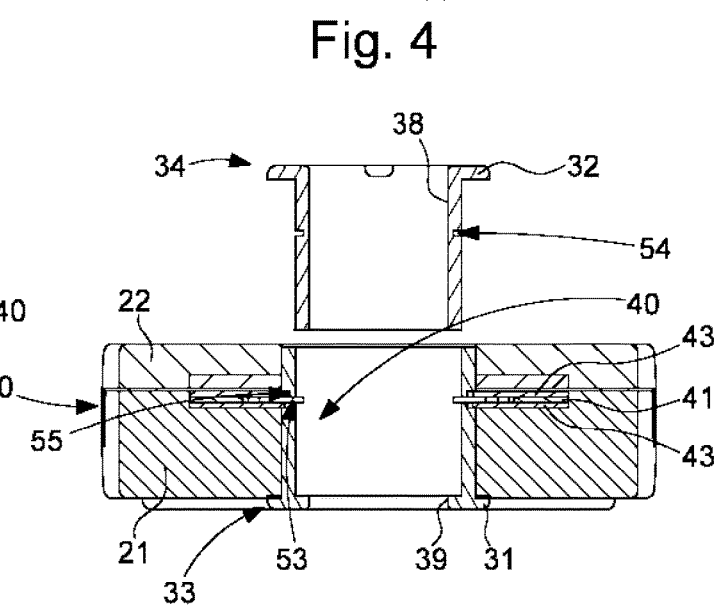
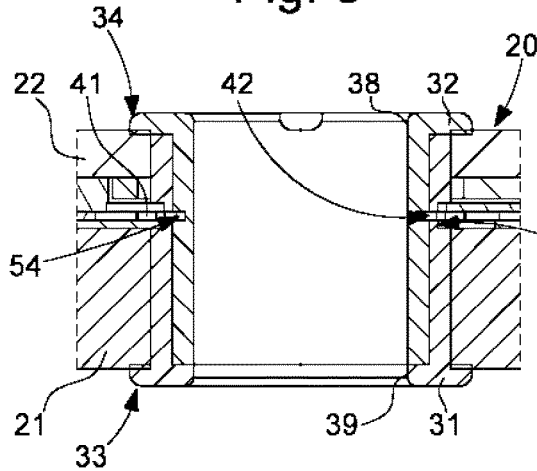
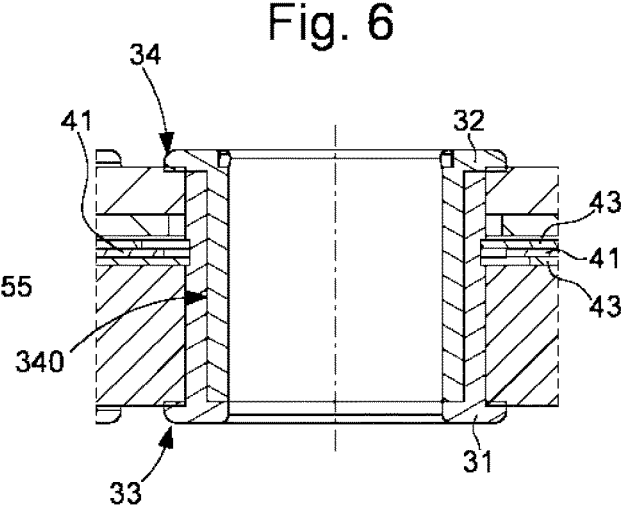

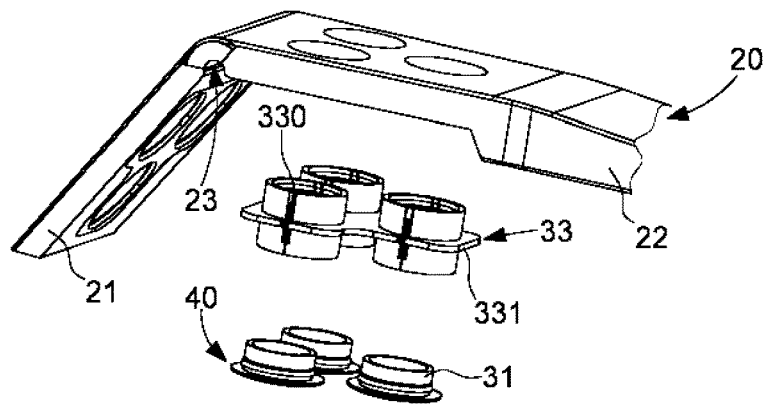
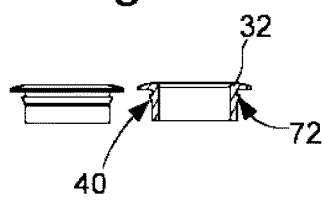
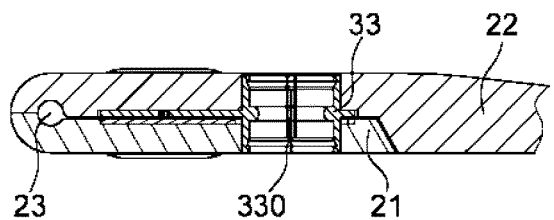
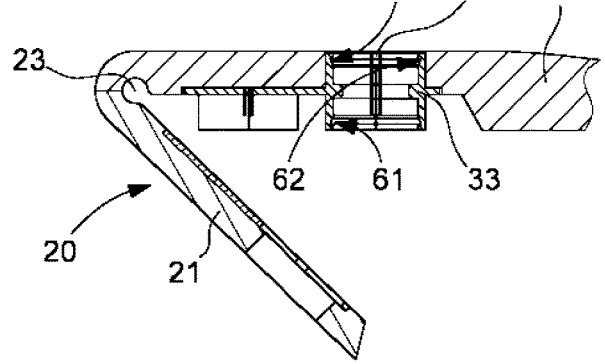
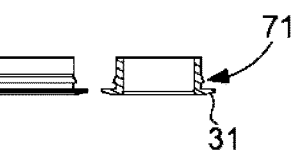
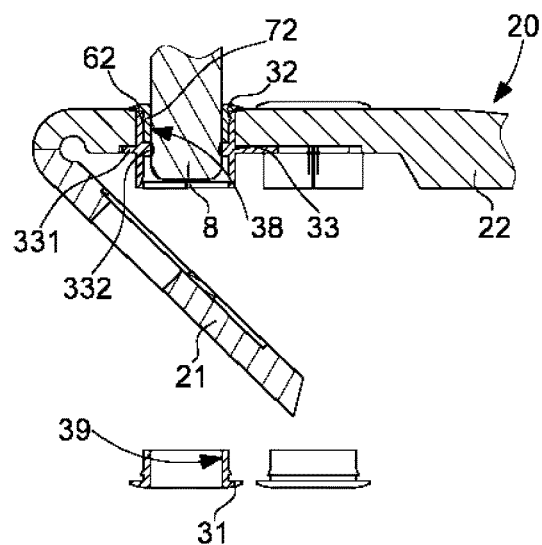
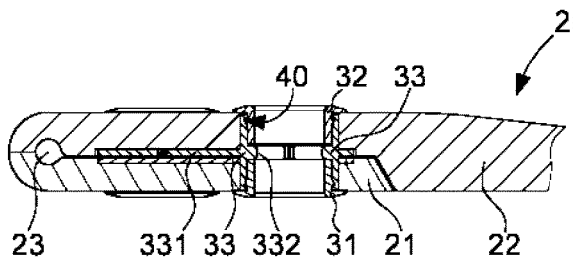

RIVETED WATCH BAND

CROSS-REFERENCE TO RELATED APPLICATIONS

This application is a divisional of U.S. patent application Ser. No. 16/039,834 filed on Jul. 19, 2018, and claims priority from European Patent Application No. 17182744.7 filed on Jul. 24, 2017. The benefit of priority is claimed to each of the foregoing, and the entire disclosure of each of which is incorporated herein by reference.

FIELD OF THE INVENTION

The invention concerns a watch band or jewelry bracelet comprising at least one band or bracelet member that includes a lower half band or bracelet portion linked adjacent at a fold portion to an upper half band or bracelet portion, which are both arranged to together surround a watch or jewelry bar or lug at said fold portion and each comprising, in symmetry with respect to said fold portion, at least one drilled hole which is arranged for the passage of a double rivet, comprised in said band or bracelet, and which comprises a lower body with a head and an upper body with a head arranged either to be inserted one inside the other coaxially, or each inserted into a common deformable tube and coaxially to said common tube, with their respective heads on either side of said band or bracelet member which is folded on itself.

The invention also concerns a watch including such a band.

The invention also concerns a piece of jewelry including a bracelet of this type.

The invention concerns the field of bands or bracelets for watches or jewelry.

BACKGROUND OF THE INVENTION

Bands or bracelets secured with rivets are appreciated in horology or jewelry for the sports customization of watches and pieces of jewelry, since the rivets constitute a reminder of applications related to major aviation, motor racing or sailing events.

These rivets are components that are increasingly finely crafted and may be made of rare materials like titanium alloys, or of precious materials, especially hallmarked materials, and the rivet heads comprise decorative elements designed to enhance the band or bracelet. Rivets comprising a central bore are especially appreciated.

These riveted bands or bracelets are conventionally used in watches or pieces of jewelry that have fixed horns or lugs that it is necessary to circumvent in order to insert the band or bracelet portions concerned. The rivets are generally irreversibly secured, since they are fitted by pounding, heading, or bonding or welding, which make it almost impossible to disassemble the rivets. Certain rivets are, moreover, purely decorative, and are not designed to be disassembled. Changing the band or bracelet thus requires destroying the rivets, generally by drilling, which is undesirable in all cases where the rivets have a high intrinsic value. The screw in rivets that exist, particularly for leather goods, do not guarantee permanent attachment, and can become unscrewed when the user and his clothes move, with the risk of losing the watch or piece of jewelry.

It is thus a question of developing a riveted band or bracelet, particularly with centrally pierced rivets, which cannot be inadvertently disassembled by the user, which can be disassembled in the workshop, thereby allowing the rivet elements to be recovered and re-used and ensuring that the band or bracelet is interchangeable.

U.S. Pat. No. 2,439,274A in the name of SPECTOR describes a riveted watch strap, comprising superposed layers of flexible material inside each strap portion, with the rivets holding two or three layers of material together, depending upon whether or not a strap portion of flexible material passes underneath the watch case, which is held by loops passed through its horns and riveted to the strap portions.

FR Patent Application No 1528737A in the name of CUIRS MEILLON describes a watch strap with visible studs, made of flexible material, comprising at least one flexible securing lug also holding the watch case. The various thicknesses of material are assembled with split shank fasteners, which each have a protruding head on the visible side of the assembly, from which two flat legs extend, folded under the assembly, which may or may not be embedded in slits arranged underneath the non visible bottom layer of flexible material, or covered by adhesive discs to prevent any injury to the user.

SUMMARY OF THE INVENTION

The invention proposes to develop a riveted band or bracelet that overcomes the drawbacks of the prior art.

To this end, the invention concerns a band or bracelet according to claim 1.

The invention also concerns a watch including a band of this type.

The invention also concerns a piece of jewelry including a bracelet of this type.

BRIEF DESCRIPTION OF THE DRAWINGS

Other features and advantages of the invention will appear upon reading the following detailed description, with reference to the annexed drawings, in which:

FIG. 1 schematically represents a watch comprising closed horns and a band according to the invention.

FIG. 2 schematically represents a piece of jewelry comprised closed lugs and a bracelet according to the invention.

FIGS. 3 to 6 illustrate a first variant of the invention:

FIG. 3 represents an exploded perspective view of two half band or bracelet portions—one upper and one lower—around a median fold portion, and comprising drilled rivet holes, a lower body that forms an outer body is arranged for insertion underneath the lower half band or bracelet portion, on top of which are prepared two stiff plates, on either side of a holding plate comprising elastic elements, all intended to be confined between the two half band or bracelet portions, which will then be folded one onto the other, and an upper body that forms an inner body, and which will be inserted into the outer body through the upper half band or bracelet portion to ensure that it is securely held on the lower half band or bracelet portion.

FIG. 4 represents, in a cross-section passing through the axis of the double rivet that will be formed by assembling these two bodies, the two half band or bracelet portions already folded down, with the holding plate immobilising the outer body at a through slot in the latter, and the inner body ready for insertion.

FIG. 5 represents, in a similar manner to FIG. 4, the same assembly after insertion of the inner body, which is then axially stopped by the same holding plate in an outer groove of the inner body.

FIG. 6 represents, in a similar manner to FIG. 5, the same assembly following a quarter turn rotation of the inner body, which pushes back the lips of the elastic holding plate, which allows it to be removed.

FIGS. 7 to 11 illustrate a second variant of the invention.

FIG. 7 represents an exploded perspective view of two half band or bracelet portions—one upper and one lower—around a median fold portion, and comprising drilled rivet holes, in a particular non-limiting variant with three double rivets, wherein three lower bodies are arranged for insertion underneath the lower half band or bracelet portion, and three common tubes are ready to be confined between the two half band or bracelet portions which will then be folded one onto the other, and three upper bodies are arranged for insertion into the common tubes through the upper half band or bracelet portion to ensure that it is securely held on the lower half band or bracelet portion.

FIG. 8 represents, in cross-section through the axis of a common tube, the arrangement of the latter between the two half band or bracelet portions.

FIG. 9 shows, in a similar manner to FIG. 8, the two half band or bracelet portions already folded over and confining the common tube.

FIG. 10 represents, in a similar manner to FIG. 9, the lower body and the upper body clipped inside the common tube.

FIG. 11 represents, in a similar manner to FIG. 10, the insertion of a tool that pushes back an inner bulge portion of the common tube in order to expand the latter and release the lower body.

DETAILED DESCRIPTION OF PREFERRED EMBODIMENTS

The invention concerns a watch band or jewelry bracelet 10 comprising at least one band or bracelet member 20, or more particularly two band or bracelet members 20.

This band or bracelet member 20 comprises a lower half band or bracelet portion 21, which is connected, adjacent at a fold portion 23, to an upper half band or bracelet portion 22. These two half band or bracelet portions 21 and 22 are both arranged to surround, together, a bar or a lug 300 of a watch 100 or of a piece of jewelry 200, at a fold portion 23.

The notions of upper or lower positioning refer to the drawings, naturally the invention can be implemented in the reverse configuration.

The half band or bracelet portions 21 and 22 each comprise, in symmetry with respect to fold portion 23, at least one drilled hole 24 arranged for the passage of a double rivet, comprised in band 10.

This double rivet comprises at least one lower body with a head 31 and a lower body with a head 32, which are arranged to be:
either in a first variant illustrated in FIGS. 3 to 6, inserted one inside the other coaxially;
or in a second variant illustrated in FIGS. 7 to 11, each inserted into a deformable common tube 30, and coaxially to each other and to the common tube 30.

The rivet heads are not detailed here. It is understood that they are arranged in a suitable position, depending on the thickness of the half band or bracelet portions, to immobilise and lightly clamp said half band or bracelet portions once the double rivet is closed onto the two assembled half band or bracelet portions.

In the usual manner, lower body 31 and upper body 32 each comprise a head arranged to axially immobilise the material of the respective half band or bracelet portion, with their respective heads on either side of band or bracelet member 20 folded onto itself.

According to the invention, band 10 comprises, at each double rivet, a snap means 40, which is arranged to ensure a reversible axial stop for lower body 31 with respect to upper body 32.

This snap means 40 includes:
either, in the first variant of FIGS. 3 to 6, at least one elastic holding plate 41, which is in particular but not limited to a slit plate, arranged to place a lower groove 55 of lower body 31 in alignment with an upper groove 54 of upper body 32 when lower body 31 and upper body 32 are inserted one inside the other;
or, in the second variant of FIGS. 7 to 11, at least two lower and upper clip lips 61 and 62 arranged inside common tube 30, and each arranged to snap fit respectively with a complementary lower clip lip 71 of lower body 31 and with a complementary upper clip lip 72 of upper body 32, when lower body 31 and upper body 32 are each inserted into common tube 30.

In the first variant, an outer body 33, which is whichever of lower body 31 and upper body 32 surrounds the other body, which is an inner body 34, comprises a through slot 53. This through slot 53 is perpendicular to its axis and arranged to serve as a housing for elastic holding plate 41.

More particularly, lower groove 55 is of rotational shape, whereas upper groove 54 and through slot 53 are linear slots.

As was seen above, the notions of lower or upper positioning refer to the drawings, but naturally the invention can be implemented in the reverse configuration, and it is understood that either lower body 31 or upper body 32 could be an outer body 33 or an inner body 34. For reasons of aesthetics, it may be decided to place the inner body on the lower half band or bracelet portion.

This elastic holding plate 41 is deformable in a plane perpendicular to the axis of the double rivet, and may be arranged in various ways: with an oblong hole on either side of which strips are deformable in the plane, or slit to define at least two parts that are also deformable in the same plane, or open in the form of retaining rings, or otherwise. Holding plate 41 comprises at least two lips 42, which are arranged to surround, in a closed position of the double rivet, a first outer groove 54 comprised in inner body 34, to axially immobilise inner body 34 with respect to holding plate 41. This first outer groove 54 is not of rotational shape, and is arranged such that a relative rotation of inner body 34 with respect to holding plate 41 towards a release position moves lips 42 sufficiently far apart, in the plane of holding plate 41, to allow the axial release of inner body 34 with respect to holding plate 41 in the release position. More particularly, lips 42 then come to bear onto a shoulder 340 comprised in inner body 34. These lips 42 can take the form, in particular, of strips, or otherwise.

More particularly, through slot 53 of outer body 33 is not of rotational shape, and is arranged such that a relative rotation of outer body 33 with respect to holding plate 41 towards an open position moves lips 42 sufficiently far apart, in the plane of holding plate 41, to allow the axial release of outer body 33 with respect to holding plate 41 in the open position.

More particularly, inner body 34 comprises, in a first axial bore 38, a first driving means, such as a notch, boss or shaped imprint, for rotational manipulation thereof by a tool inserted into first bore 38, which explains why one may wish to conceal it, and place it, in such case, on the lower half band or bracelet portion. Likewise, more particularly, outer body 33 comprises, in a second axial bore 39, a second driving means for rotational manipulation thereof by a tool inserted into second bore 39. In a simpler embodiment, inner body 34 or outer body 33 can be manoeuvred by friction, or with a gripper manipulated in extension, by an after-sales technician.

In a particular embodiment, snap means 40 comprises at least one rigid plate 43, in particular two rigid plates 43 on either side of elastic holding plate 41. This rigid plate 43 is arranged to press holding plate 41 into a second outer groove 55 comprised in outer body 33 and into which through slot 53 opens. The Figures illustrate two such rigid plates 43, on either side of holding plate 43, which provides the advantage of ensuring that plate 43 deforms only in the plane perpendicular to the axis of the double rivet. In the illustrated variant, these two rigid plates include offset oblong holes, which, once combined, perfectly position the double rivet in the plane of the band or bracelet member. Finally, these two plates are fixed to each other and to one of the half band or bracelet portions, to complete the attachment of the outer body to the band. In a particular, non-illustrated variant, one such rigid plate 43 can be replaced or supplemented by an elastic plate forming a return means in the axial direction of the double rivet.

Assembling the band in this first variant is very easy: the outer rivet body is held inside one half band or bracelet portion, by means of the holding plate and each stiff plate, the other half band or bracelet portion is folded over the lug of the watch or piece of jewelry, at the fold portion, onto the first half band or bracelet portion. The inner rivet body is inserted into the already mounted rivet body, the holding plate passes through the outer rivet and locks the inner body to block it axially and to prevent it from coming out again. Disassembly is also easy: by imparting a quarter turn rotation to the inner body via a suitable tool, to separate the holding plate locking lips, in order to release it.

In the second variant, lower body 31 and upper body 32 are arranged to each be inserted into a common tube 30. Consequently, they can be identical. Depending on the embodiment, either common tube 30 is elastically deformable, or lower body 31 and upper body 32 are elastically deformable. In yet another variant, an embodiment can be made in two half tubes, particularly elastically bonded with a silicon adhesive or similar, by adjusting the elasticity of the band.

More particularly, in the illustrated version, common tube 30 is elastically deformable, and comprises at least one longitudinal slot 330 over all or part of its length, and which is arranged to allow the release of the snap means when expansion is imparted to common tube 30.

More particularly, lower body 31 and upper body 32 each comprise a bore 39, respectively 38, which is arranged for the passage of a tool to come into contact with an inner bulge portion 332 comprised in common tube 30, to deform and expand said tube into a position releasing lower body 31 and/or upper body 32.

More particularly, common tube 30 comprises at least one median collar 331, which is arranged to be inserted between lower half band or bracelet portion 21 and upper half band or bracelet portion 22. This median collar 331 may, in particular, be used as a surface for bonding to the upper half band or bracelet portion.

In a particular, non-illustrated embodiment, common tube 30 comprises a plurality of elastically assembled elements.

Assembling the band according to this second variant is also very easy: the common tube is inserted into one of the half band or bracelet portions, resting on its collar, the two half band or bracelet portions are folded one onto the other over the lug of the watch or piece of jewelry, at the fold portion. The upper and lower bodies are simply clip fitted inside the common tube. For disassembly, the technician inserts a tool into the rivet bore and presses on the bulge portion in order to expand the common tube, the two bodies are then unclipped and the band is disassembled. It is noted that it is possible to release one or other of these bodies as desired, if it is not wished to remove them simultaneously.

The invention also concerns a watch 100 including such a band 10.

The invention also concerns a piece of jewelry 200 including such a bracelet 10.

In short, the invention provides an interchangeability function, with a reversible assembly of rivets by a watch-making technician. This ensures that the watch or of the piece of jewelry is worn safely. The invention thus allows for the customization of bands or bracelets by making it easy to use an assortment of materials and textures for the bands or bracelets on the one hand, and for the rivet bodies on the other, which offers clients a wide variety of different looks, on request.

What is claimed is:

1. A watch band or jewelry bracelet comprising:
   at least one band or bracelet member which comprises a lower half band or bracelet portion connected adjacent at a fold portion to an upper half band or bracelet portion both arranged to together surround a watch or jewelry bar or lug at said fold portion and each including, in symmetry with respect to said fold portion, at least one drilled hole arranged for the passage of a double rivet, comprised in said band or bracelet, and which has a lower body with a head and an upper body with a head arranged each inserted into a common deformable tube and coaxially to said common tube, with their respective heads on either side of said band or bracelet member folded onto itself,
   wherein said band or bracelet comprises, at each said double rivet, a snap means for ensuring a reversible axial stop for said lower body with respect to said upper body, said snap means comprising at least two lower and upper clip lips arranged inside said common tube, and each arranged to snap fit respectively with a complementary lower clip lip of said lower body and with a complementary upper clip lip of said upper body, when said lower body and said upper body are each arranged to be inserted into said common tube.

2. The band or bracelet according to claim 1, wherein said common tube is elastically deformable and comprises at least one longitudinal slot over all or part of its length to allow the release of said snap means when expansion is imparted to said common tube.

3. The band or bracelet according to claim 2, wherein said lower body and said upper body each comprise a bore arranged for the passage of a tool to come into contact with an inner bulge portion comprised in said common tube, to deform and expand said tube into a position releasing said lower body and/or upper body.

4. The band or bracelet according to claim 1, wherein said common tube comprises at least one median collar arranged to be inserted between said lower half band or bracelet portion and said upper half band or bracelet portion.

5. The band or bracelet according to claim 1, wherein said common tube comprises a plurality of elastically assembled elements.

6. A watch comprising the band according to claim 1.

7. A piece of jewelry comprising the bracelet according to claim 1.

* * * * *

UNITED STATES PATENT AND TRADEMARK OFFICE
CERTIFICATE OF CORRECTION

PATENT NO. : 10,869,527 B2
APPLICATION NO. : 16/656144
DATED : December 22, 2020
INVENTOR(S) : Vuille et al.

It is certified that error appears in the above-identified patent and that said Letters Patent is hereby corrected as shown below:

On the Title Page

Column 1, Item (73), in "Assignee", Line 2, delete "Ltd.," and insert -- Ltd, --, therefor.

Signed and Sealed this
Twelfth Day of April, 2022

Drew Hirshfeld
*Performing the Functions and Duties of the
Under Secretary of Commerce for Intellectual Property and
Director of the United States Patent and Trademark Office*